(12) United States Patent
Wu

(10) Patent No.: US 8,117,325 B1
(45) Date of Patent: Feb. 14, 2012

(54) POLICY-BASED CROSS-DOMAIN ACCESS CONTROL FOR SSL VPN

(75) Inventor: Yuhua Wu, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 208 days.

(21) Appl. No.: 12/111,306

(22) Filed: Apr. 29, 2008

(51) Int. Cl.
  *G06F 7/04* (2006.01)
  *G06F 15/16* (2006.01)
  *G06F 15/173* (2006.01)
  *H04L 29/06* (2006.01)
  *H04L 9/32* (2006.01)

(52) U.S. Cl. ............. 709/229; 726/4; 726/15; 726/27; 713/153; 713/168

(58) Field of Classification Search ............ 709/223, 709/224, 225, 229; 726/27, 4, 15; 713/153, 713/168
See application file for complete search history.

(56) References Cited

U.S. PATENT DOCUMENTS

| | | | | |
|---|---|---|---|---|
| 6,985,920 | B2* | 1/2006 | Bhattacharya et al. | 709/200 |
| 7,487,539 | B2* | 2/2009 | Ramachandran et al. | 726/10 |
| 2003/0093666 | A1* | 5/2003 | Millen et al. | 713/157 |
| 2004/0044768 | A1* | 3/2004 | Takahashi | 709/225 |
| 2005/0108299 | A1* | 5/2005 | Nakajima | 707/201 |
| 2005/0185658 | A1* | 8/2005 | Kamiwada et al. | 370/401 |
| 2006/0112174 | A1* | 5/2006 | L'Heureux et al. | 709/223 |
| 2006/0184647 | A1* | 8/2006 | Dixit et al. | 709/219 |
| 2006/0218304 | A1* | 9/2006 | Mukherjee et al. | 709/246 |
| 2007/0239732 | A1* | 10/2007 | Dixit et al. | 707/10 |
| 2007/0289006 | A1* | 12/2007 | Ramachandran et al. | 726/10 |
| 2008/0144655 | A1* | 6/2008 | Beam et al. | 370/466 |
| 2009/0106349 | A1* | 4/2009 | Harris | 709/203 |
| 2009/0119363 | A1* | 5/2009 | Suzuki | 709/203 |
| 2009/0132713 | A1* | 5/2009 | Dutta et al. | 709/227 |
| 2009/0138937 | A1* | 5/2009 | Erlingsson et al. | 726/1 |
| 2009/0193126 | A1* | 7/2009 | Agarwal et al. | 709/228 |
| 2009/0199285 | A1* | 8/2009 | Agarwal et al. | 726/9 |
| 2009/0276835 | A1* | 11/2009 | Jackson et al. | 726/4 |

* cited by examiner

*Primary Examiner* — Joseph Avellino
*Assistant Examiner* — Aftab Nasir Khan
(74) *Attorney, Agent, or Firm* — Harrity & Harrity, LLP

(57) ABSTRACT

A method may include generating a request that includes a host domain associated with a multiple-domain-to-one domain mapping, capturing the request before transmission of the request, rewriting the host domain, and transmitting the request.

13 Claims, 7 Drawing Sheets

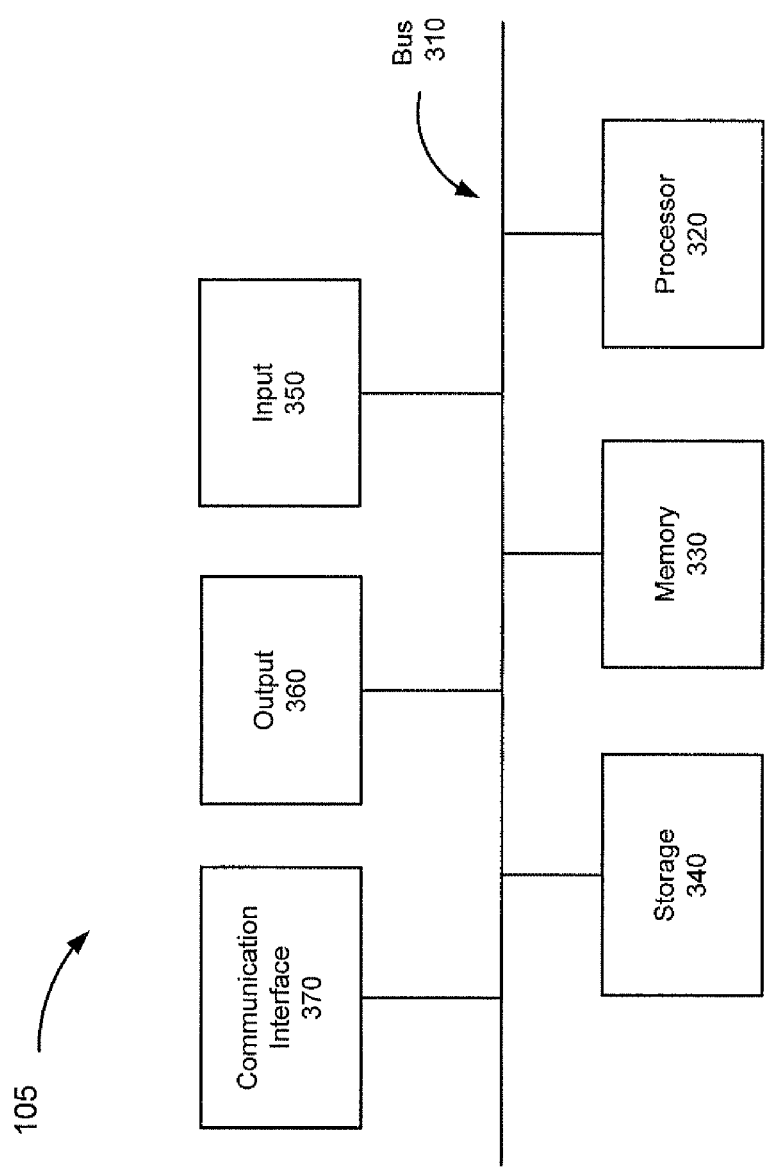

POLICY-BASED CROSS-DOMAIN ACCESS CONTROL FOR SSL VPN

BACKGROUND

Secure Sockets Layer Virtual Private Network (SSL VPN) technology allows users to establish a secure, remote access session to a network resource from virtually any Internet-connected web browser. In addition to the security provided by SSL VPN technology, web browsers may have, among other things, cross-domain access control policy settings. However, existing SSL VPN architectures may map all domains into one domain when a web browser loads a web page. For example, the domains of resources in a network may be mapped to one domain (e.g., a SSL gateway domain). As a result, client-side cross-domain access control policies may be bypassed at the web browser of a client terminal.

SUMMARY

According to one aspect, a method may include generating a request that includes a host domain associated with a multiple-domain-to-one domain mapping, capturing the request before transmission of the request, rewriting the host domain, and transmitting the request.

According to another aspect, a device may include a memory containing instructions and a processor that executes the instructions. The processor may execute the instructions to generate a request including a request Uniform Resource Identifier (URI) and a default host domain, capture the request before transmitting the request to another device, rewrite the default host domain to a host domain related to the request URI, and transmit the request to the other device.

According to still another aspect, a computer-readable memory device having stored thereon instructions, executable by a processor, the computer-readable memory device may include an instruction for generating a request for connecting to another device, the request including a default host domain and a request URI, an instruction for rewriting the default host domain to a host domain associated with the request URI, and an instruction for transmitting the request.

According to yet another aspect, a device may include means for generating a request including a request Uniform Resource Identifier (URI) and a default host domain, means for determining a host domain based on the request URI, means for rewriting the default host domain to the determined host domain, and means for transmitting the request.

According to another aspect, a system may include a user terminal to receive a user input for connecting to another device, generate a request based on the user input, the request including a default host domain, a Uniform Resource Identifier (URI) related to the other device, and a reference domain related to an existing connection, identify the default host domain in the request, determine a host domain related to the URI, rewrite the default host domain to the determined host domain, and transmit the request.

BRIEF DESCRIPTION OF THE DRAWINGS

The accompanying drawings, which are incorporated in and constitute a part of this specification, illustrate one or more embodiments described herein and, together with the description, explain aspects of the invention. In the drawings:

FIG. 3A is a diagram illustrating exemplary components of a device that may correspond to the client depicted in FIGS. 1 and 2.

DETAILED DESCRIPTION

The following detailed description refers to the accompanying drawings. The same reference numbers in different drawings may identify the same or similar elements. Also, the following description does not limit the invention.

The term "may" is used throughout this application and is intended to be interpreted, for example, as "having the potential to," "configured to," or "being able to", and not in a mandatory sense (e.g., as "must"). The terms "a", "an", and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

The term "domain" is used throughout this application and is intended to be interpreted, for example, as a partitioned resource. The resource may include, among other things, a device, an application, a service, data, etc. Correspondingly, the term "cross-domain" may be interpreted as involving at least two domains.

The term "component," as used herein is intended to be broadly interpreted to include, for example, hardware, a combination of hardware and software, firmware, and/or software.

The concepts described herein provide for enforcing cross-domain access control policies. In one implementation, such enforcement may be implemented in a secure networking environment. Although SSL and Hypertext Transfer Protocol (HTTP) may be discussed in reference to implementations associated with the concepts described herein, these concepts are not dependent on employing a particular protocol. Additionally, although a client/server environment may be discussed in reference to implementations associated with the concepts described herein, these concepts are not dependent on employing this particular architectural model.

Figure 1:
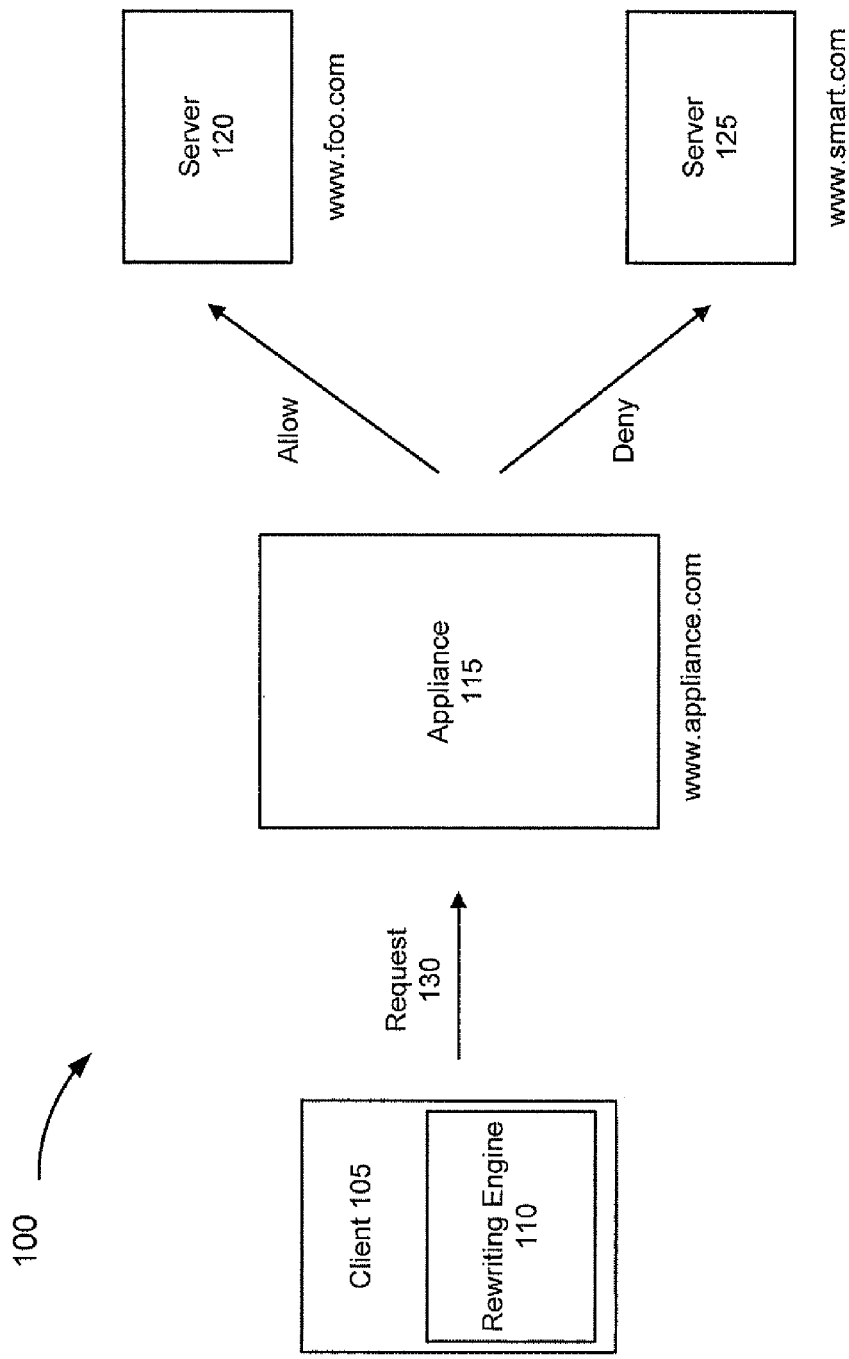
FIG. 1 is a diagram illustrating concepts described herein.

FIG. 1 is a diagram illustrating an exemplary environment 100 in which concepts described herein may be implemented. As illustrated, environment 100 may include, among other devices, a client 105 having a rewriting engine 110, an appliance 115, and servers 120 and 125.

Client 105 may include a device having communication capability. For example, client 105 may include a user terminal, such as a stationary device (e.g., a computer, an Internet kiosk, etc.) or a portable device (e.g., a wireless phone, a personal digital assistant (PDA)), capable of connecting to a network. Client 105 may include a web browser.

Rewriting engine 110 may include a component that, among other things, captures and rewrites a request (e.g., an HTTP request). For example, the request may relate to connecting to and/or accessing a domain (e.g., servers 125 and 130). Rewriting engine 110 will be described in greater detail below.

Appliance 115 may include a device having communication capability. For example, appliance 115 may include a router, a switch, a repeater, a hub, a gateway, a bridge, a server or a network security device, such as a firewall or intrusion detection system. Appliance 115 may have the capability to enforce network policies, such as cross-domain access control policies. Appliance 115 may have the capability to provide a secure communication link to resources and/or services (e.g., servers 120 and 125) for a user terminal (e.g., client 105). Appliance 115 may employ a secure protocol (e.g., SSL, Transport Layer Security (TLS), etc.). In one implementation, appliance 115 may include an SSL gateway.

Servers 125 and 130 may include a device having communication capability. For example, servers 125 and 130 may include a host terminal, such as a computer, that provides resources and/or services to other devices, such as client 105. Servers 125 and 130 may include a web server.

For purposes of discussion, assume that a user of client 105 is visiting server 120 that has a Uniform Resource Identifier (URI) of www.foo.com. Further assume that the hosting page's domain (i.e., www.foo.com) is an acceptable domain in connection with client-side access policies. Thereafter, the user clicks on a link to www.smart.com and a request is generated (e.g., an HTTP request). In a multiple-domain-to-one domain scheme, the generated HTTP request may include, among other things, a host header and a referer header. The host header and the referer header are specified in the HTTP standard. For example, the host header may include a host domain (e.g., www.appliance.com) and the referer header may include a reference domain (e.g., www.foo.com). In this instance, rewriting engine 110 may capture the generated HTTP request and rewrite the HTTP request. For example, the generated HTTP request may be rewritten to include, for example, a host header that includes a host domain (e.g., www.smart.com) and a referer header that includes a reference domain (e.g., www.foo.com). In this way, the multiple domains-to-one domain mapping of, for example, the host domain (e.g., www.appliance.com) associated with appliance 115 may be addressed so that cross-domain access control policies can be enforced.

Client 105 may transmit a request 130 to appliance 115 and appliance 115 may receive request 130 and, among other things, determine whether the domains in request 130 are the same or are different. That is, if the domains associated with the host header and the referer header are the same, then appliance 115 will allow the request. If the domains associated with the host header and the referer header are different, then appliance 115 may determine, based on cross-domain access control policies, whether to allow or block request 130. For purposes of discussion, assume that cross-domain access control policies provide that the domain of www.smart.com should be blocked. In such a case, appliance 115 will block request 130 and the user may not be able to connect to server 125.

As a result of the foregoing, client-side policy restrictions, such as cross-domain access control policies, may be enforced and not bypassed, even when multiple domains-to-one domain mapping is employed. Unlike access control lists (ACLs), which require an administrator to create and manage access policies, the concepts described herein may provide a more efficient solution to implement access control policies. Since the concepts have been broadly described in relation to FIG. 1, variations to the above concepts will be discussed further below.

Although FIG. 1 illustrates an exemplary environment 100, in other implementations, environment 100 may include additional, different, or fewer devices than those illustrated in FIG. 1. Thus, it will be appreciated that environment 100 is exemplary in terms of, among other things, the number of devices, the connections between and/or among the devices, etc. The connections in FIG. 1 may be direct, indirect, as well as wired and/or wireless. Additionally, or alternatively, one or more of the devices in FIG. 1 may perform the functions of one or more of the other devices depicted in FIG. 1.

Exemplary Environment

Figure 2:
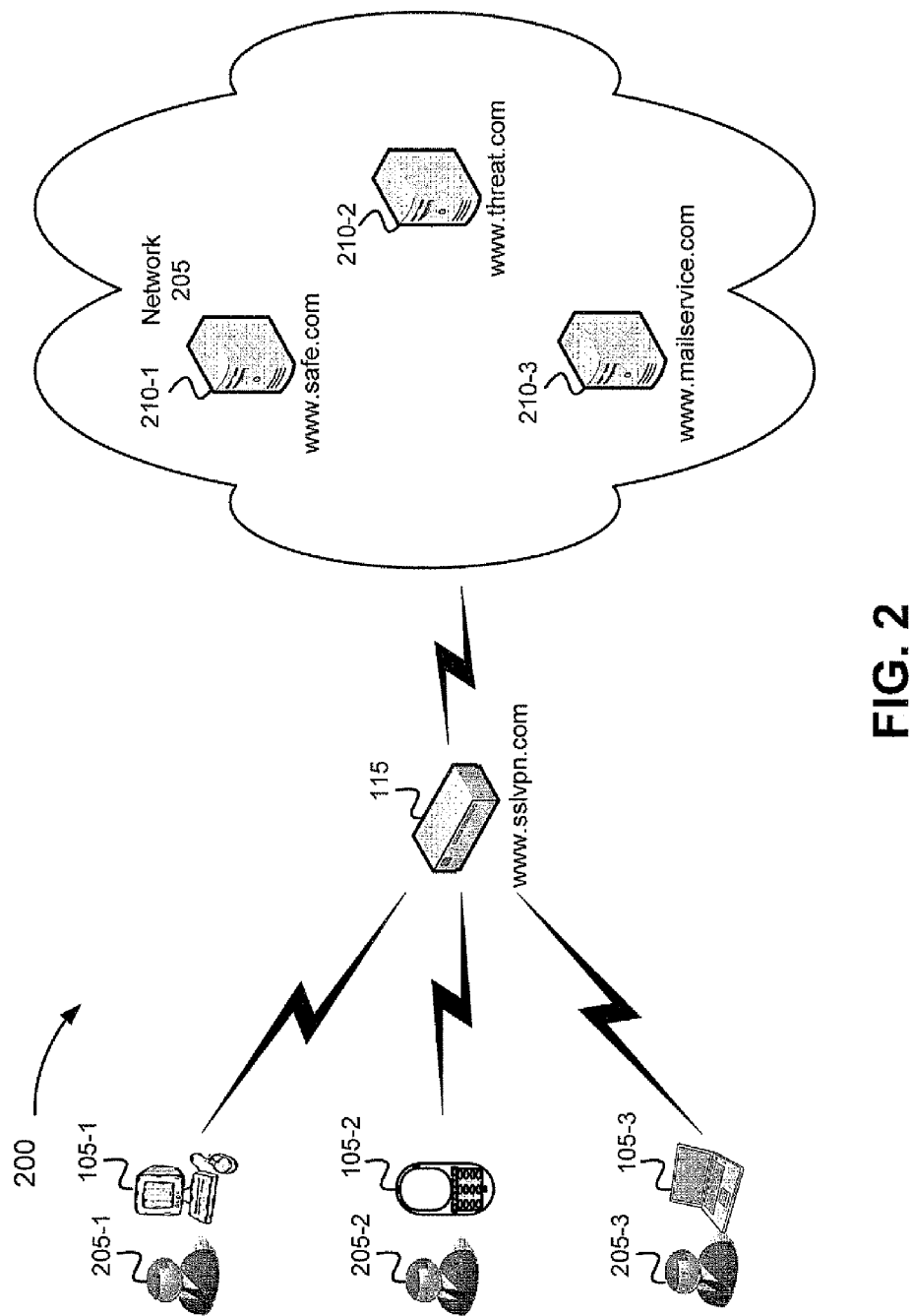
FIG. 2 is a diagram illustrating an exemplary environment in which concepts described herein may be implemented.

FIG. 2 is a diagram illustrating an exemplary environment in which concepts described herein may be implemented. As illustrated, environment 200 may include clients 105-1, 105-2, 105-3 each having a rewriting engine 110 associated therewith, appliance 115 and network 205. Network 205 may include servers 210, 215 and 220.

Clients 105-1, 105-2, and 105-3 may correspond to client 105, as previously described in connection to FIG. 1, and may be operated by users 205-1, 205-2, and 205-3, respectively. Clients 105-1, 105-2, and 105-3 may be referred to as client 105. For purposes of discussion, appliance 115 will be described as a SSL VPN gateway having a domain of www.sslvpn.com. Client 105 may be configured such that appliance 115 is the host domain when accessing network 205.

Network 205 may include, for example, the Internet, an Intranet, a local area network (LAN), a wide area network (WAN), a wireless network, a telephone network (e.g., a Public Switched Telephone Network (PSTN)), any other type of network, and/or a combination of networks.

Servers 210-1, 210-2, and 210-3 may include a device that provides services and/or resources to users 205-1, 205-2, and 205-3. Servers 210-1, 210-2, and 210-3 may be referred to as server 210. For purposes of discussion, assume server 210-1 has a domain of www.safe.com, server 210-2 has a domain of www.threat.com, and server 210-3 has a domain of www-.mailservice.com.

Although FIG. 2 illustrates an exemplary environment 200, in other implementations, environment 200 may include fewer, additional, or different devices.

Exemplary Components of the Client

FIG. 3A is a diagram illustrating exemplary components of client 105 depicted in FIGS. 1 and 2. As illustrated, client 105 may include, among other things, a bus 310, a processor 320, a memory 330, a storage 340, an input 350, an output 360, and/or a communication interface 370.

Bus 310 may include a path that permits communication among the components of device 300. For example, bus 310 may include a system bus, an address bus, a data bus, and/or a control bus. Bus 310 may also include bus drivers, bus arbiters, bus interfaces, and/or clocks.

Processor 320 may include a general-purpose processor, a microprocessor, a data processor, a co-processor, a network processor, an application specific integrated circuit (ASIC), a controller, a programmable logic device, a chipset, a field programmable gate array (FPGA), or some other component that may interpret and/or execute instructions.

Memory 330 may include a device that stores data and/or instructions related to the operation and use of client 105. For example, memory 330 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Storage 340 may include a device that stores data and/or software applications related to the operation and use of client 105. For example, storage 340 may include a hard disk (e.g., a magnetic disk, an optical disk, a magneto-optic disk, etc.), a compact disc (CD), a digital versatile disc (DVD), a floppy disk, a cartridge, a magnetic tape, another type of storage medium, or another type of computer-readable medium, along with its corresponding drive. The term "computer-readable medium" is intended to be broadly interpreted to include a physical or a logical memory device.

Input 350 may include a mechanism that permits a user to input information to client 105. For example, input 350 may include a keyboard, a keypad, a mouse, a button, a switch, a microphone, voice recognition logic, etc. Output 360 may include a mechanism that outputs information to a user. For example, output 360 may include a display, a speaker, one or more light emitting diodes (LEDs), etc.

Communication interface 370 may include any transceiver-like mechanism that enables client 105 to communicate with other devices and/or systems. For example, communication interface 370 may include an Ethernet interface, an optical interface, a coaxial interface, a radio interface, or the like.

As will be described in detail below, client 105 may perform certain operations. Client 105 may perform these operations in response to processor 320 executing software instructions contained in a computer-readable medium, such as memory 330 and/or storage 340. For example, the software instructions may be read into memory 330 from another computer-readable medium or from another device via communication interface 370. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although, FIG. 3A illustrates exemplary components of client 105, in other implementations, client 105 may include fewer, additional, and/or different components than those depicted in FIG. 3A. In still other implementations, one or more components of client 105 may perform one or more other tasks described as being performed by one or more other components of client 105.

Exemplary Rewriting Engine

Figure 3B:
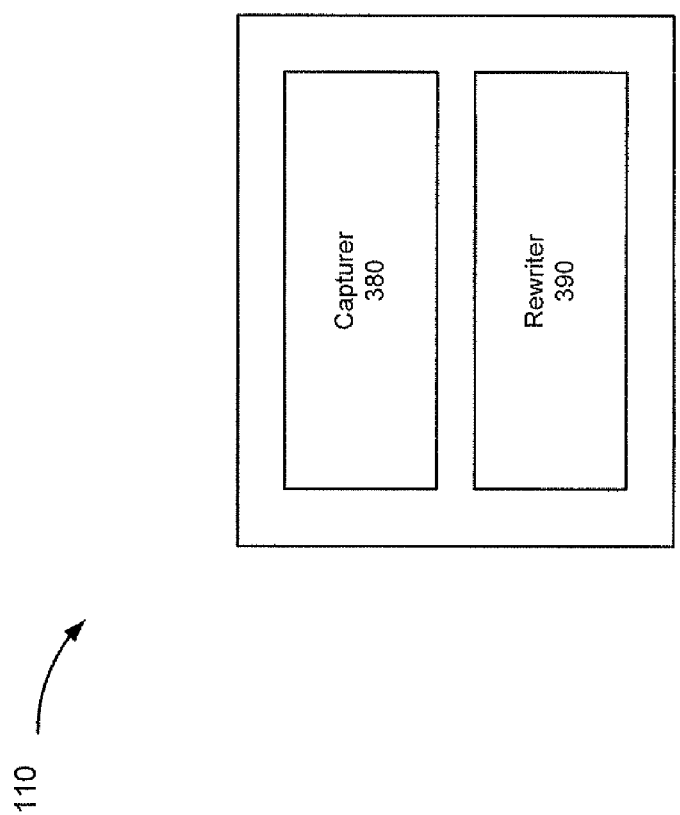
FIG. 3B is a diagram illustrating exemplary components of the rewriting engine.

FIG. 3B is a diagram illustrating an exemplary rewriting engine 110. Rewriting engine 110 may include exemplary functional components, such as a capturer 380 and a rewriter 390. For purposes of discussion, functions associated with rewriting engine 110 will be discussed in terms of an HTTP request. However, the functionality associated with rewriting engine 110 is not dependent on these particularities.

Capturer 380 may trap (e.g., capture) an HTTP request. For example, when an HTTP request is generated, capturer 380 may trap the request before transmission to another device, such as appliance 115. Capturer 380 may pass the trapped request to rewriter 390.

Rewriter 390 may process a trapped request and may revise the content of the trapped HTTP request. For example, rewriter 390 may provide that the trapped HTTP request include, among other things, a host domain associated with a request URI. The host domain may be included in a host header of the trapped HTTP request. Rewriter 390 will be described in greater detail below in connection with FIG. 5.

Although FIG. 3B illustrates exemplary functions associated with rewriting engine 110, in other implementations, rewriting engine 110 may include fewer, additional, and/or different functions than those depicted in FIG. 3B.

Exemplary Components of the Appliance

Figure 4:
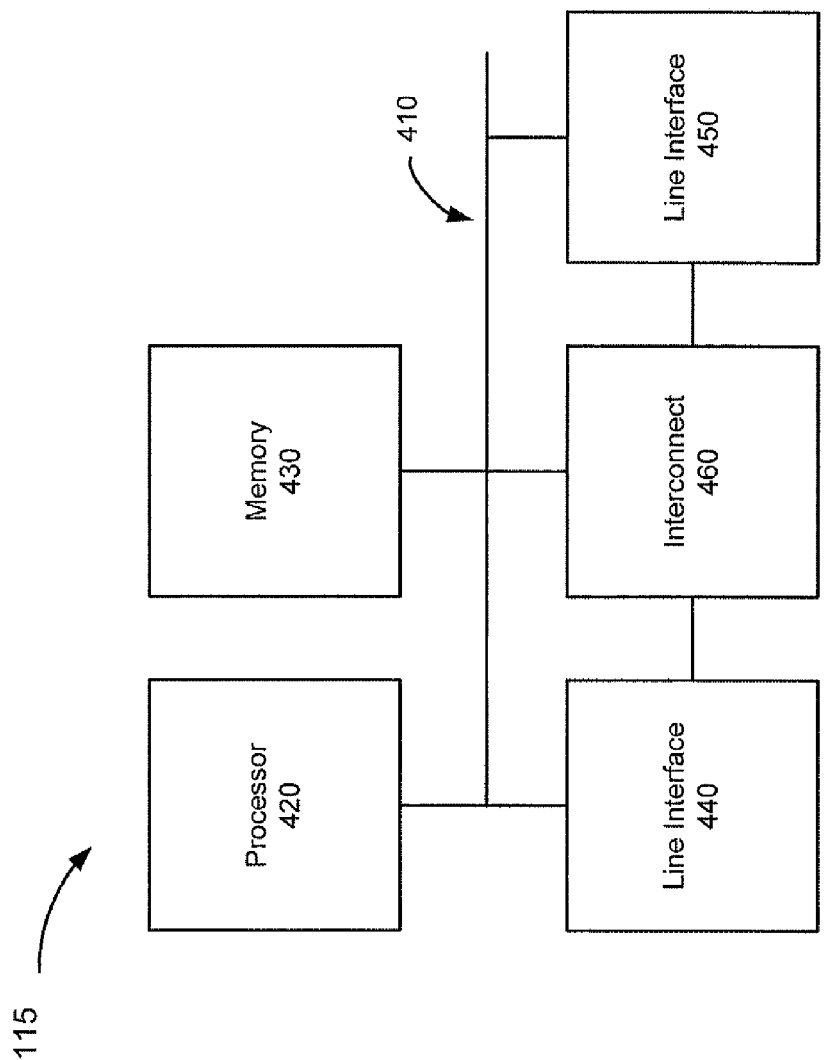
FIG. 4 is a diagram illustrating exemplary components of the appliance depicted in FIGS. 1 and 2.

FIG. 4 is a diagram illustrating exemplary components of appliance 115 depicted in FIG. 2. As illustrated, appliance 115 may include, among other things, a bus 410, a processor 420, a memory 430, a line interface 440, a line interface 450, and an interconnect 460.

Bus 410 may include a path that permits communication among the components of appliance 115. For example, bus 410 may include a system bus, an address bus, a data bus, and/or a control bus. Bus 410 may also include bus drivers, bus arbiters, bus interfaces, etc.

Processor 420 may include a general purpose processor, a microprocessor, a controller, a data processor, a network processor, a co-processor, an application specific integrated circuit (ASIC), a field programmable gate array (FPGA), discrete hardware components, and/or some other type of component that may interpret and/or execute instructions.

Memory 430 may include a device that stores data and/or instructions related to the operation of appliance 115. For example, memory 430 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Line interfaces 440 and 450 may include a network interface card (NIC), a communication port, an infrared interface, a Personal Computer Memory Card International Association (PCMCIA) card, a line card, etc. Line interfaces 440 and 450 may include an ASIC and/or another type of component.

Line interfaces 440 and 450 may implement industry promulgated protocol standards, such as Transmission Control Protocol/Internet Protocol (TCP/IP), Asynchronous Transfer Mode (ATM), Digital Subscriber Line (DSL), Integrated Services Digital Network (ISDN), Fiber Channel, Synchronous Optical Network (SONET), Ethernet IEEE 802 standards, HTTP, HTTP over SSL (HTTPS), IP security (IPSec), Telecommunication Network (Telnet), Simple Network Management Protocol (SNMP), etc. Additionally, or alternatively, line interfaces 440 and 450 may implement non-standard, proprietary, and/or customized interface protocols. Line interfaces 440 and 450 may each contain a plurality of line interfaces to handle multiple traffic flows.

Interconnect 460 may include a switch or a connection for conveying an incoming packet from line interface 440 to line interface 450 based on, among other things, destination information. The term "packet," as used herein, is intended to be broadly interpreted to include a datagram, a frame, a cell, or any other type of delivery unit or mechanism. Interconnect 460 may include a communication bus or a switching fabric.

Appliance 115 may perform certain operations, as described in detail below. Appliance 115 may perform these operations in response to processor 420 executing software instructions contained in a computer-readable medium, such as memory 430. The software instructions may be read into memory 430 from another computer-readable medium, such as from another device via line interfaces 440 and/or 450. The software instructions contained in memory 430 may cause processor 420 to perform processes that will be described later. Alternatively, hardwired circuitry may be used in place of or in combination with software instructions to implement processes as described herein. Thus, implementations described herein are not limited to any specific combination of hardware circuitry and software.

Although FIG. 4 illustrates exemplary components of appliance 115, in other implementations fewer, additional, or different components may be utilized. Further, in other implementations, the configuration of the components, as depicted in FIG. 4, may be different. It will be appreciated that appliance 115 may be capable of providing services not specifically described herein. For example, appliance 115 may be capable of providing authentication and/or encryption services.

Exemplary Processes

Provided below are processes for enabling cross domain access control policies to be enforced even when multiple domains-to-one domain mapping may be employed. For purposes of discussion, process 500 will be described with appliance 115 being the host domain for client 105-1 when accessing network 205, as previously mentioned above in connection with FIG. 2.

Figure 5:
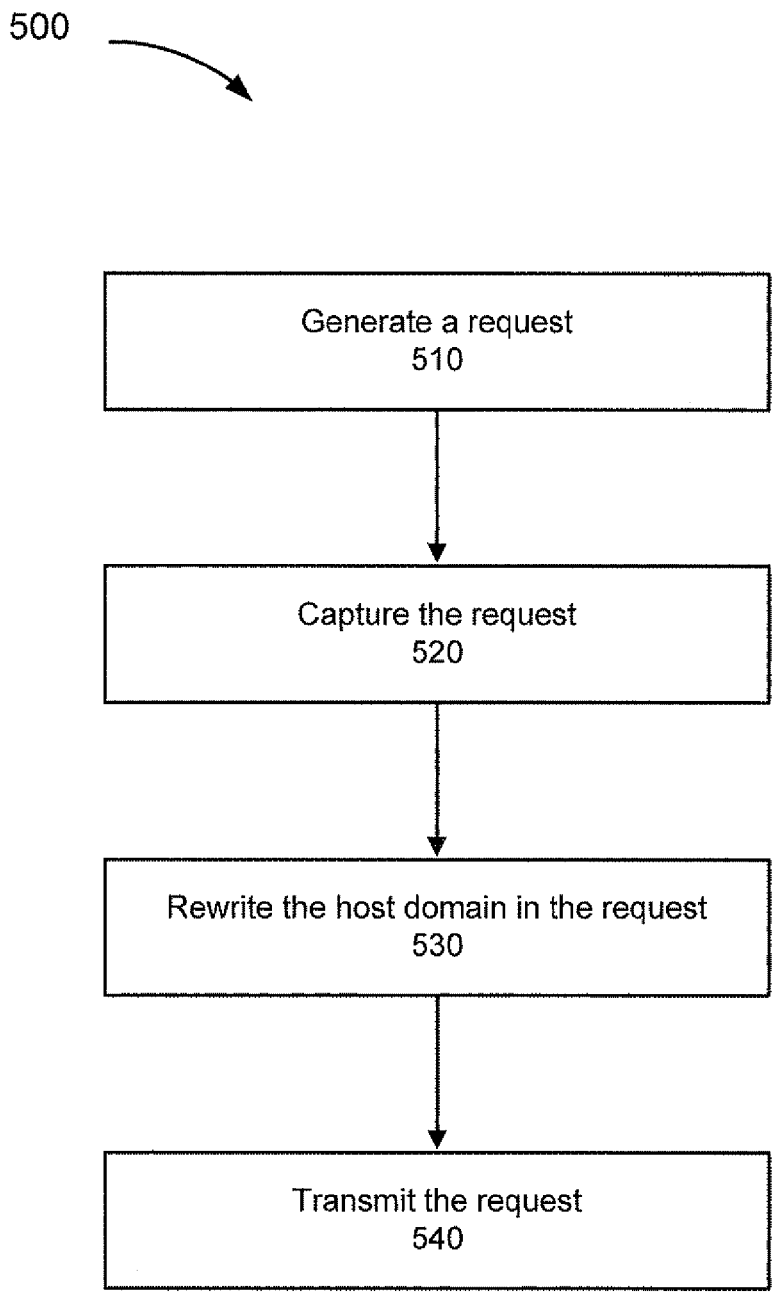
FIG. 5 is a flow chart illustrating an exemplary process associated with the concepts described herein.

FIG. 5 is a flow chart illustrating an exemplary process 500. For purposes of discussion, process 500 will be described as being performed by client 105 (e.g., client 105-1). Further, for purposes of discussion, assume that user 205-1 has previously connected to server 210-1 via appliance 115.

Process 500 may begin with a request being generated (block 510). For example, user 205-1 may click on a link to connect to www.threat.com/security at server 210-2, which will be assumed as a cross-domain request. In other words, the request is from one domain (e.g., www.safe.com) to another domain (e.g., ww.threat.com). In this regard, the URI (www.threat.com/security) may be considered to be the request URI. Client 105-1 may generate an HTTP request (e.g., a GET request) to connect to server 210-2. In accordance with the HTTP standard, the HTTP request may include, among other things, a host header, a referer header, and the request URI. In this example, the host header may include the URI of appliance 115 (e.g., www.sslvpn.com), and the referer header may include the URI of device 210-1 (e.g., www.safe.com).

The request may be captured (block 520). For example, capturer 380 of rewriting engine 110 may trap the HTTP request before transmission. Capturer 380 may pass the trapped HTTP request to rewriter 390.

The request may be rewritten (block 530). Rewriter 390 may rewrite the host domain in the host header. For example, rewriter 390 may determine the host header field and the request URI in the HTTP request. Rewriter 390 may rewrite the host domain in the host header based on the request URI. In this example, rewriter 390 may rewrite the host header to include the URI of device 210-2 (www.threat.com), which, for purposes of discussion, corresponds to the host domain associated with the request URI (www.threat.com/security).

The request may be transmitted (block 540). In this example, client 105-1 may transmit the rewritten HTTP request to appliance 115.

Although FIG. 5 illustrates an exemplary process 500, in other implementations, fewer, additional, or different processes may be employed.

Figure 6:
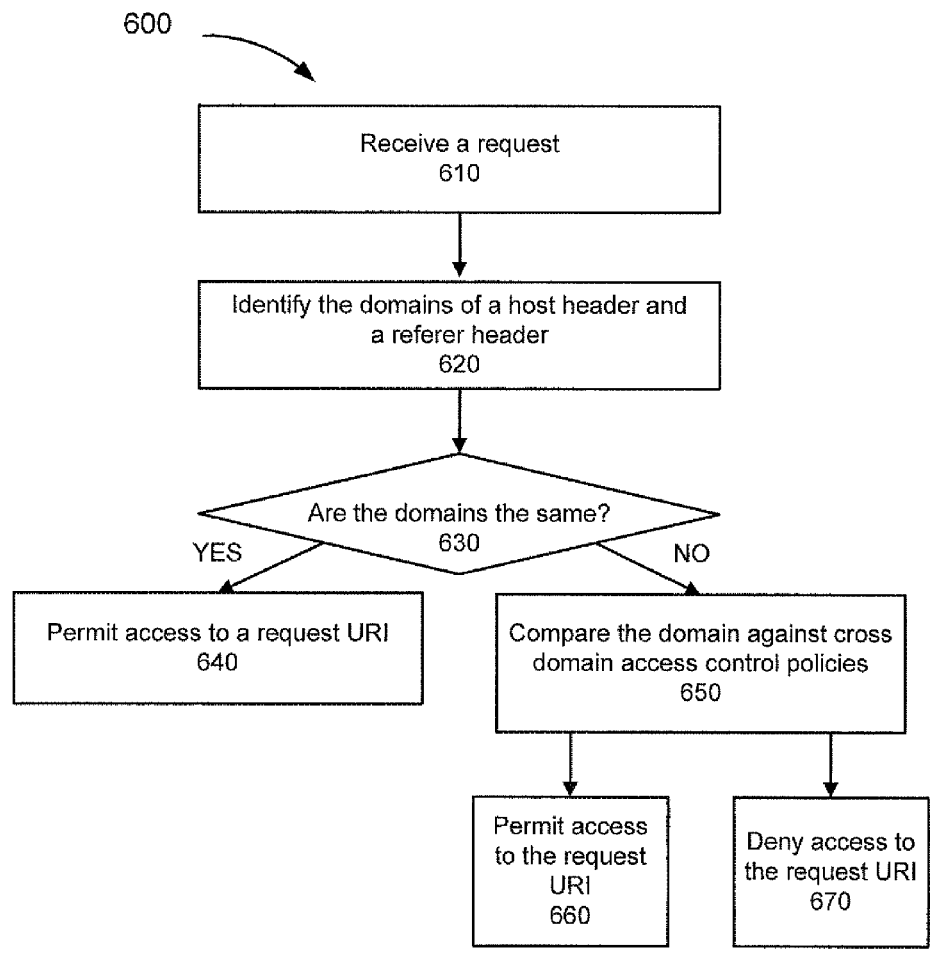
FIG. 6 is a flow chart illustrating another exemplary process associated with the concepts described herein.

FIG. 6 is a flow chart illustrating another exemplary process 600. For purposes of discussion, process 600 will be described as being performed by appliance 115. Further, for purposes of discussion, assume that user 205-1 connected to server 210-1 via appliance 115, as previously described in connection with FIG. 5.

Process 600 may begin with receiving a request (block 610). For example, appliance 115 may receive the rewritten HTTP request of block 530 from client 105-1.

The domains of a host header and a referrer header may be identified (block 620). For example, appliance 115 may identify the domains associated with the URIs included in the host header and the referer header of the HTTP request. As previously described in connection with FIG. 5, the host header may include the URI (e.g., www.threat.com) and the referer header may include the URI (e.g., www.safe.com).

It may be determined whether the domains are the same (block 630). For example, appliance 115 may determine whether the domains are the same. In other words, appliance 115 may determine whether a cross-domain request has been received. For example, appliance 115 may compare the URIs (www.threat.com and www.safe.com) to determine whether the domains are the same. If it is determined that the domains are the same (block 630—YES), then appliance 115 may permit access to the request URI associated with the HTTP request.

On the other hand, if it is determined that the domains are not the same (block 630—NO), then appliance 115 may compare the domain associated with the host header to cross-domain access control policies (block 650). For example, appliance 115 may compare the domain (www.threat.com) with cross-domain access control policies. If it is determined, based on the cross-domain access control policies, that client 105-1 is permitted to access this domain, then appliance 115 may permit access to server 210-2 (block 660). For example, appliance 115 may forward the HTTP request to server 210-2. On the other hand, if it is determined, based on the cross-domain access control policies, that client 105-1 is not permitted to access this domain, then appliance 115 may deny access to server 210-2 (block 670). For example, appliance 115 may discard the HTTP request.

Although FIG. 6 illustrates an exemplary process 600, in other implementations, fewer, additional, or different processes may be employed.

CONCLUSION

The foregoing description of implementations provides an illustration, but is not intended to be exhaustive or to limit the implementations to the precise form disclosed. Modifications and variations are possible in light of the above teachings or may be acquired from practice of the teachings. For example, the HTTP request may not include the host header and/or the referer header. Rather, the host domain and/or the reference domain information may be included in another portion of the HTTP request. Additionally, or alternatively, cross-domain requests may be enforced at the client side. In one implementation, for example, instead of client 105-1 sending the HTTP request to appliance 115 for comparison with cross-domain access control policies, client 105-1 may send the host and reference domains in, for example, a separate message (e.g., out-of-band), to appliance 115. Appliance 115 may make a comparison and determine whether access is permissible or not. In the event that access is not permissible, appliance 115 may relay this information to client 105-1, and user 205-1 may be notified (e.g., a dialog message) that access is denied.

In addition, while series of blocks have been described with regard to the processes illustrated in FIGS. 5 and 6, the order of the blocks may be modified in other implementations. Further, non-dependent blocks may be performed in parallel. Further, it may be possible to omit blocks within processes 500 and 600.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combination of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the implementations described herein unless explicitly described as such.

What is claimed is:

1. A method comprising:
    establishing, by a client device, a secure sockets layer virtual private network (SSL VPN) connection to a device;
    generating, by the client device, a hypertext transfer protocol (HTTP) request to connect to the device through the SSL VPN connection, where the HTTP request is associated with a multiple-domain-to-one domain mapping, and where the HTTP request includes a reference to a default host domain and a Uniform Resource Identifier (URI) related to the device for the SSL VPN connection;
    capturing, by the client device and before transmission of the HTTP request, the HTTP request; identifying, by the client device, the reference to the default host domain; determining, by the client device, a host domain related to the URI;
    rewriting, by the client device, the host domain, in the captured HTTP request, to form a rewritten HTTP request, where rewriting the captured HTTP request includes replacing, in captured HTTP request, the reference to the default host domain with a reference to the determined host domain related to the URI; and
    transmitting, by the client device, the rewritten HTTP request to the device,
    where the transmitted HTTP request is also received by a gateway device, and where the gateway device:
    determines that the received HTTP request includes a cross-domain request based on the rewritten host domain and a reference domain, and
    enforces cross-domain access control policies in response to determining that the received HTTP request includes the cross-domain request.

2. The method of claim 1, where the gateway device, when enforcing the cross-domain access control policies, further:
    evaluates the rewritten host domain based on the cross-domain access control policies; and
    regulates access to the rewritten host domain based on evaluating the rewritten host domain.

3. The method of claim 1, where transmitting the rewritten request includes: transmitting the rewritten HTTP request via a virtual private network gateway.

4. A device comprising:
    a memory device to store instructions; and
    a processor that executes the instructions to:
    establish a secure sockets layer virtual private network (SSL VPN) connection to another device, where the device comprises a client device,
    generate a hypertext transfer protocol (HTTP) request, to the other device, where the HTTP request is associated with a multiple-domain-to-one domain mapping, and where the HTTP request includes a reference to a default host domain, and a request Uniform Resource Identifier (URI), for the SSL VPN connection,
    capture the HTTP request before transmitting the request to the other device,
    identify, in the captured HTTP request, the reference to the host domain,
    determine a host domain related to the request URI, where the default host domain differs from the determined host domain related to the request URI,
    rewrite the captured HTTP request, where the processor, when rewriting the request, is further to replace the identified reference to the default host domain, in the captured request, with a reference to the determined host domain related to the request URI, and
    transmit the rewritten request to the other device and to a gateway device, where the gateway device:
    determines that the received HTTP request includes a cross-domain request based on the rewritten host domain and a reference domain, and
    enforces cross-domain access control policies in response to determining that the received HTTP request includes the cross-domain request.

5. The device of claim 4, where the processor further executes instructions to: provide a web browser to generate the request based on a user input.

6. The device of claim 4, where the determined host domain corresponds to a domain associated with a particular device that provides a secure communication link to the request URI.

7. The device of claim 4, where the request includes a reference domain related to an existing connection.

8. The device of claim 4, where the other device includes an access control policy enforcement device.

9. A non-transient computer-readable memory device having stored thereon instructions, executable by a processor of a client device, the non-transient computer-readable memory device comprising:
    an instruction to establish a secure sockets layer virtual private network (SSL VPN) connection to another device;
    an instruction to generate a hypertext transfer protocol (HTTP) request to connect, via the SSL VPN, to the other device, where the HTTP request is associated with a multiple-domain-to-one domain mapping, and where the HTTP request includes a reference a default host domain, and a request Uniform Resource Identifier (URI) for the SSL VPN connection;
    an instruction to identify, in the HTTP request, the reference to the default host domain;
    an instruction to determine a host domain related to the request URI;

an instruction to rewrite the HTTP request, including replacing the reference to the default host domain with a reference to the determined host domain associated with the request URI; and an instruction to transmit the rewritten HTTP request, where the other device includes a gateway device, and where the rewritten HTTP request enables the gateway device to:

determine that the rewritten HTTP request includes a cross-domain request based on the rewritten host domain and a reference domain, and enforce cross-domain access control policies in response to determining that the rewritten HTTP request includes the cross-domain request.

10. The non-transient computer-readable memory device of claim 9, where the default host domain corresponds to a domain associated with a network device to provide a secure communication link to a network device associated with the request URI.

11. A device comprising:

a secure connection unit, executing on a processor of the device, to establish a secure sockets layer virtual private network (SSL VPN) connection to another device, where the device includes a client device;

a generating unit, executing on a processor of the device, to generate a hypertext transfer protocol (HTTP) request, to the other device, where the HTTP request is associated with a multiple-domain-to-one domain mapping, and where the HTTP request includes a request Uniform Resource Identifier (URI), a reference to a reference domain associated with the SSL VPN connection, and a reference to a default host domain;

an identifying unit, executing on a processor of the device, to identify, in the HTTP request, the reference to the default host domain;

a determining unit, executing on a processor of the device, to determine a host domain based on the request URI;

a rewriting unit, executing on a processor of the device, rewrite the captured HTTP request, where the processor when rewriting the request, is further to replace the identified reference to the default host domain, in the captured request, with a reference to the determined host domain related to the request URI and a transmitting unit, executing on a processor of the device, to transmit, to the other device, the rewritten request, and transmit the rewritten HTTP request to a gateway device, where the gateway device:

determines that the rewritten HTTP request includes a cross-domain request based on the rewritten host domain and a reference domain, and enforces cross-domain access control policies in response to determining that the rewritten HTTP request includes the cross-domain request.

12. A system comprising:

a user terminal, where the user terminal includes:

a user interface to:

receive a user input for connecting to a device, and a processor to:

establish a secure sockets layer virtual private network (SSL VPN) connection to the device, generate, based on the user input, a hypertext transfer protocol (HTTP) request to the device, where the request is associated with a multiple-domain-to-one domain mapping associated with the SSL VPN connection, the request including a reference to a default host domain, and a Uniform Resource Identifier (URI) for the SSL VPN connection, identify the reference to the default host domain in the request, determine a host domain related to the URI, rewrite the HTTP request, where the processor, when rewriting the HTTP request, is further to replace the reference to the default host domain with a reference to the determined host domain, and transmit the rewritten request; and a gateway device, where the gateway device includes a gateway processor to:

receive the transmitted HTTP request from the user terminal, determine that the HTTP request includes a cross-domain request based on the reference domain and the determined host domain, compare the determined host domain with a cross-domain access control policy in response to determining that the HTTP request includes the cross-domain request, and regulate access to the device.

13. The system of claim 12, where the gateway device includes a secure sockets layer virtual private network (SSL VPN) gateway.

* * * * *

UNITED STATES PATENT AND TRADEMARK OFFICE
CERTIFICATE OF CORRECTION

PATENT NO.       : 8,117,325 B1
APPLICATION NO.  : 12/111306
DATED            : February 14, 2012
INVENTOR(S)      : Yuhua Wu Page 1 of 1

It is certified that error appears in the above-identified patent and that said Letters Patent is hereby corrected as shown below:

Column 11, claim 11, line 45, change the word "to" to read --to:--.

Signed and Sealed this
Twenty-seventh Day of March, 2012

David J. Kappos
*Director of the United States Patent and Trademark Office*